July 17, 1962  W. R. MERCER ETAL  3,045,232
ELECTRONIC VELOCITY INDICATOR APPARATUS
Filed March 30, 1956  2 Sheets-Sheet 1
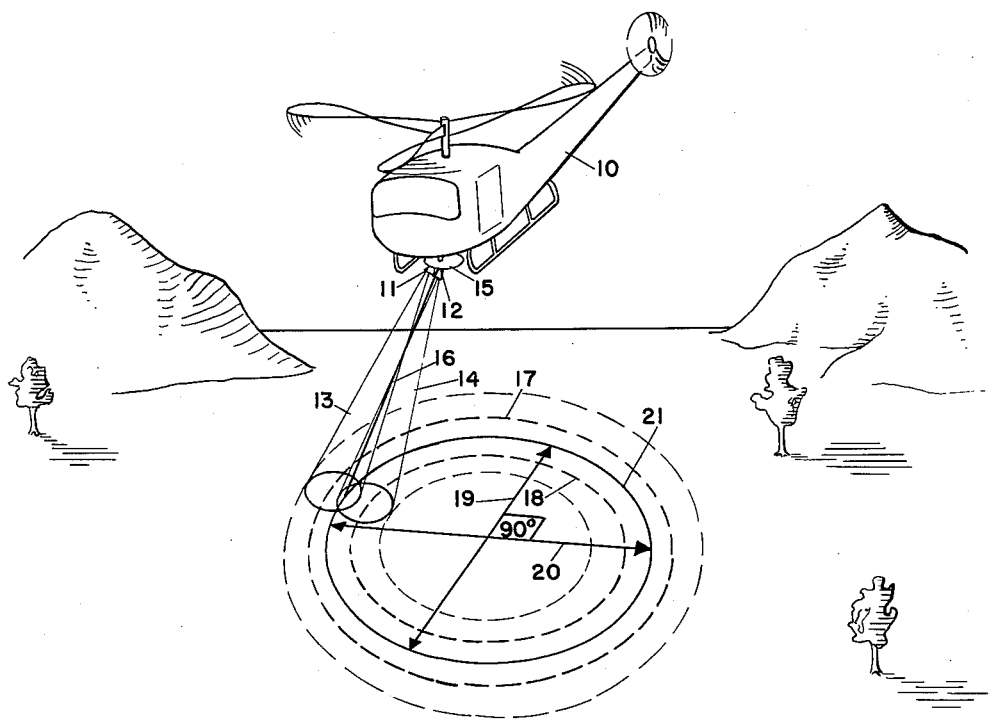
Fig. 1
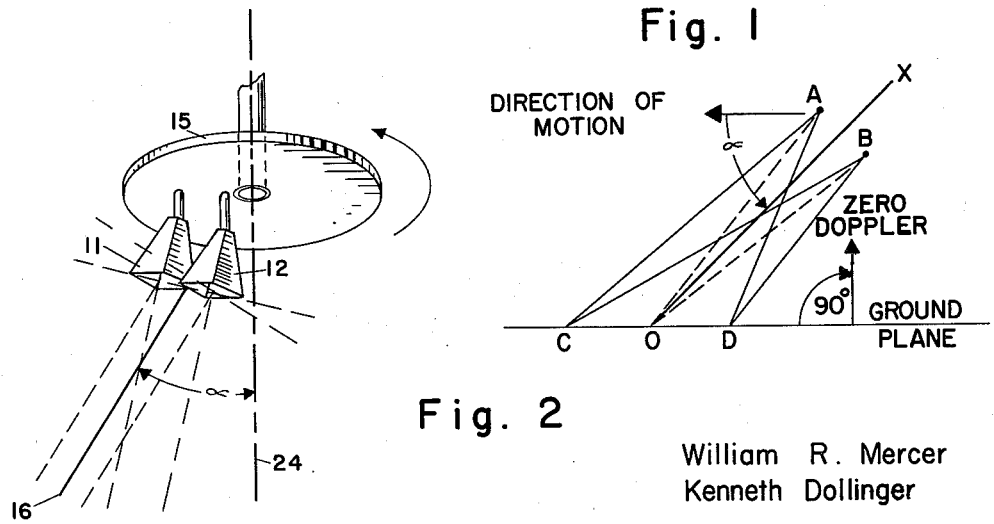
Fig. 1a
Fig. 2
William R. Mercer
Kenneth Dollinger
*INVENTORS*

William R. Mercer
Kenneth Dollinger
*INVENTORS.*

United States Patent Office 3,045,232
Patented July 17, 1962

---

3,045,232
ELECTRONIC VELOCITY INDICATOR APPARATUS
William R. Mercer, Belmont, Mass., and Kenneth Dollinger, Derry, N.H., assignors, by mesne assignments, to Sanders Associates, Inc., Nashua, N.H., a corporation of Delaware
Filed Mar. 30, 1956, Ser. No. 575,697
12 Claims. (Cl. 343—8)

The present invention relates to electrical controls. More particularly, the invention relates to electronic velocity indicators as used, for example, in aircraft navigation. More especially, the invention relates to velocity indicators incorporating radar techniques which utilize Doppler frequency signals.

According to well-known Doppler principles, the apparent frequency of a signal emanating from a body moving toward an observer is greater than the actual frequency of the signal as originally radiated. Conversely, the apparent frequency of such a signal as detected by such an observer is less than the actual frequency radiated by a body moving away. More particularly, the incremental, or Doppler frequency is a measure of the relative velocity of a body moving along a given axis. Radar systems are commonly used in the prior art which detect the velocity by comparing the frequency transmitted with that of received signals reflected from a target, commonly termed echoes. It is well known, however, that such radar systems are subject to Doppler frequency noise; for example, a range of Doppler frequencies is normally encountered. There arises then the problem of ascertaining the correct Doppler frequency to measure true velocity along a given axis. Moreover, differing signals having the same frequency are characterized by a random distribution of phase relations. Such Doppler noise is principally generated by rough terrain and nearby objects.

It is therefore an object of the invention to provide an improved electronic velocity indicator apparatus capable of selecting from a signal having a range of frequencies, a particular frequency to provide an accurate indication of velocity.

Another object of the invention is to provide an improved velocity indicator capable of producing continuous and reliable indications of velocity along a given axis.

A still further object of the invention is to provide an improved electrical control apparatus which responds to the phase relation between signals to provide a control signal.

A still further object of the invention is to provide an electrical control apparatus which produces a control signal having a frequency varying in accordance with the phase relation between signals.

In accordance with the invention there is provided an electrical control apparatus which comprises a source of alternating current signals having a range of frequencies and a second source of alternating current signals having a second range of frequencies. At least one signal from each of the sources has the same frequency. Phase comparator means are provided which respond to the signal for producing an output control signal representing the above-mentioned same frequency signals and varying in accordance with the phase relation between the same frequency signals.

For a better understanding of the present invention, together with other and further objects thereof, reference is made to the following description taken in connection with the accompanying drawings and its scope will be pointed out in the appended claims.

In the drawings:
FIG. 1 is a diagrammatic, perspective view of an aircraft in flight and embodying the invention;
FIG. 1a is a detail view of the antenna platform;
FIG. 2 is a schematic diagram illustrating a principle of the invention; and
FIG. 3 is a schematic block diagram of an electronic velocity indicator apparatus embodying the invention.

Description of FIGS. 1 and 1a

Referring now in more detail to the drawings and with particular reference to FIG. 1, there is illustrated a helicopter 10 equipped with an electronic velocity indicator apparatus (not shown) embodying the present invention. A pair of antennas 11 and 12, coupled to the indicator, transmit directive beams 13 and 14, respectively, to ground. The beams 13 and 14 overlap as shown to define an axis of symmetry or null axis 16 along which reflected signals or echoes are equidistant from antennas 11 and 12. It will be apparent that reflected signals of the same frequency are identical in phase only if generated along the axis of symmetry. In contrast return signals from rough terrain, for example, exhibit a random, changing phase pattern even though a number of them have the same frequency.

The antennas 11 and 12 are attached to a rotatable platform 15 shown in FIG. 1a, which rotates, for example, about a vertical axis 24. As shown in greater detail in FIG. 1a the antennas 11 and 12 are offset relative to the axis 16 and the vertical axis of rotation 24. It will be apparent that the antennas need not be co-radial as shown but may be positioned to either side of the axis 16 or otherwise circumferentially displaced. Referring again to FIG. 1, rotation of the platform 15 causes the centers of the beams 13 and 14 to describe circular paths 17 and 18 on the ground to provide conventional conical scanning. The locus on the ground of the null axis 16 is a circle 21. The circles 17, 18, and 21, as illustrated, define a ground plane. As will presently be described, motion of the helicopter 10 parallel to the ground is resolved along a pair of orthogonal axes, a heading axis 19 and a drift axis 20.

Principles of Operation

Considering briefly the operation of the system as a whole, and neglecting for the moment the detailed description and operation of the electronic velocity indicator apparatus shown in FIG. 3, the apparatus illustrated is essentially a Doppler frequency tracking system. In particular, an axis of symmetry or null axis between the antennas 11 and 12 exists along which the reflected Doppler frequency signals are equidistant from each antenna. Such signals having the same frequency are also of the same phase; consequently, the system servos exclusively about that Doppler frequency common to the two antennas and having the same phase. Assuming the craft attitude to be substantially level and the rate of change of altitude to be known, the Doppler frequency derived from the null axis is at once a measure of the true ground speed of the craft. The Doppler frequency, for a given forward velocity, varies from zero along an axis to ground normal to the direction of motion, there being no motion along this axis if the altitude is maintained constant, to a maximum frequency along the axis between the plane and the horizon.

A reference plane is needed with respect to which motion is to be measured and ground is the most convenient reference. The null axis is chosen, therefore, to be a predetermined angle α, for example 20°, with respect to the heading axis normally parallel to ground. Consequently, signals reflected from between the ground intercepts of the null and vertical axes are lower in frequency than those from between the ground intercepts of the null axis and the forward-reverse or heading axis of the aircraft. The desired signal, adjusted in terms of the angle α for true ground speed, is characterized by the same frequency and phase relation in both antennas, while for signals from off the null axis there exits a correlated frequency and phase error.

Referring now to FIG. 2 there is shown a schematic diagram illustrating the principles outlined above. The antennas are shown as point sources A and B moving in a direction parallel to ground. The axis of symmetry or null axis OX intersects the ground and is displaced from the head axis by an angle α. Signals generated in the region OD have frequencies less than those generated in the region OC. For signals derived from the region OD, the representative path length AD is greater than the representative path length BD. Accordingly, signals received by antenna A lag in phase those received by antenna B. Analogously, since the path AC is shorter than the path BC, signals received from the region OC at antenna A lead in phase those received by antenna B. It will be seen, therefore, that by determining the phase relation between two signals of the same frequency received in the pair of antennas, a control signal may be produced to ascertain the direction in the frequency spectrum of the correct signal frequency. In particular, in the novel system described herein, a frequency error is also characterized by a phase error, thus enabling an accurate phase error tracking circuit to select the correct Doppler signal received to produce an indication of true ground speed.

Directional velocity information is obtained by rotating the antennas at a known rate while simultaneously driving a generator which provides a reference signal for comparison in the well-known manner. When the antenna beams are oriented orthogonally to the direction of motion of the craft, a zero Doppler frequency condition exists. Since the rotational angle at which zero Doppler occurs rotates with changes in direction of flight of the craft, component velocities along the orthogonal drift and heading axes can be resolved.

*Detailed Description of the Embodiment in FIG. 3*

Figure 3:
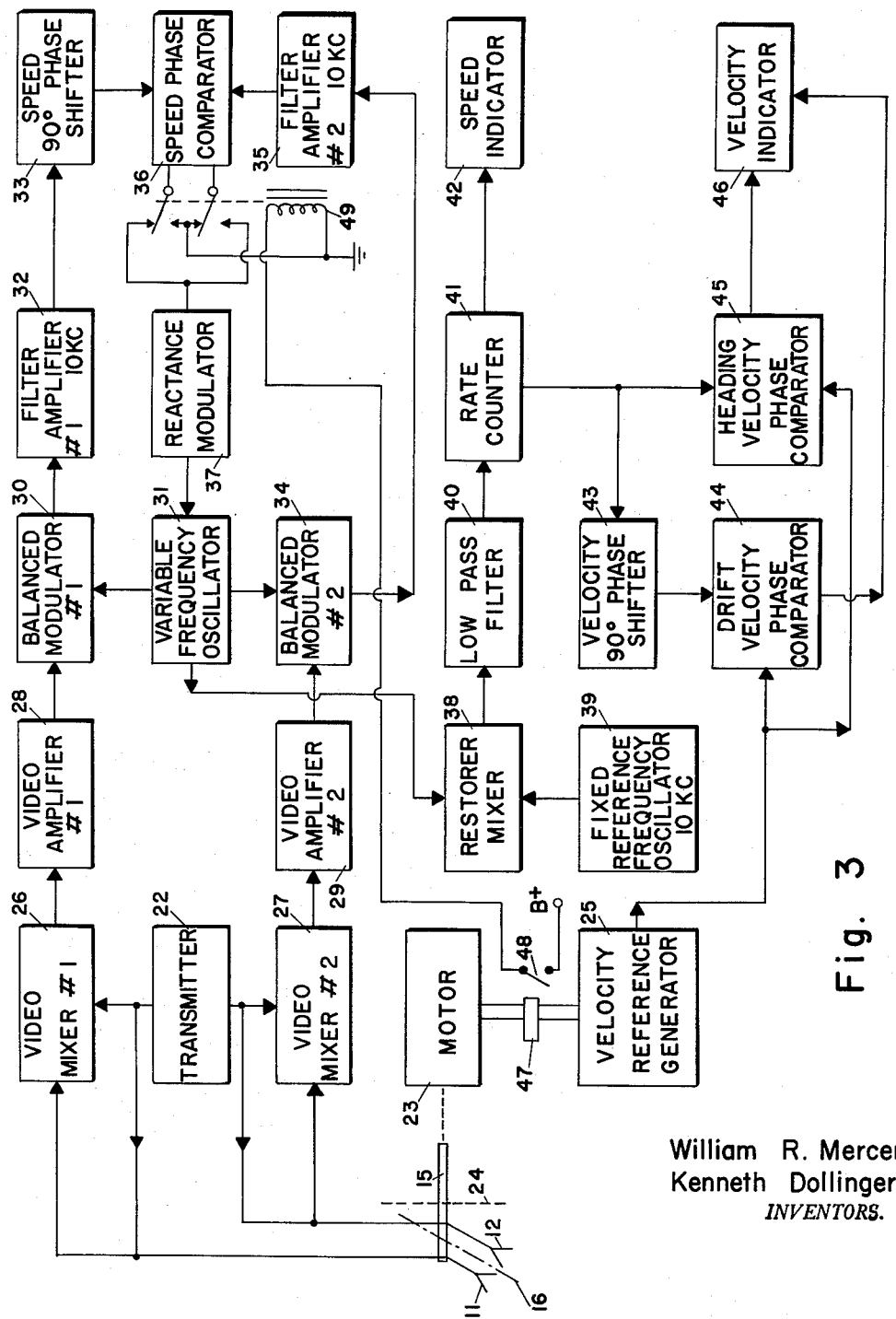

Referring now to FIG. 3, there is here illustrated a schematic block diagram of an electronic velocity indicator apparatus. The apparatus comprises a pair of directional antennas 11 and 12 which are coupled through a pair of rotary joints (not shown) to a transmitter 22. The transmitter 22 operates, for example, at a frequency of 10,000 megacycles and utilizes, for example, a klystron oscillator to generate a radio signal. A motor 23 is mechanically coupled to the antennas 11 and 12 to rotate them about the vertical axis 24 and provide conical scanning at a frequency, for example, of 10 cycles per second. The motor 23 drives a velocity reference generator 25 to provide a velocity reference signal at a frequency twice that of the conical scanning frequency. The transmitter 22 is further coupled to a pair of video mixers 26 and 27 which are in turn coupled to the antennas 11 and 12, respectively. The coupling between the transmitter 22, the antennas 11 and 12, and the mixers 26 and 27 is directional in the conventional manner to preclude the full transmitter power from being applied to the mixers. Couplings of this description include such well-known devices as a hybrid ring and "Magic-T."

The output circuit of each of the mixers 26 and 27 is coupled in cascade in the order named through a video frequency amplifier, and a balanced modulator or intermediate frequency mixing means, to an intermediate frequency filter amplifier tuned to pass only a very narrow band signal, for example, 10 kcs.±30 cycles. In more detail, the units 28, 30 and 32 are coupled to the output circuit of the mixer 26 and similarly the units 29, 34 and 35 for the mixer 27.

The output circuit of the amplifier 32 is coupled through a quadrature phase shifter 33 to a phase comparator 36, while that of the amplifier 35 is coupled directly to the phase comparator 36. The comparator 36 is a conventional balanced phase detector for developing an output signal varying in amplitude and sense in accordance with the phase relation of input signals impressed thereon. Thus, input signals with zero phase difference produce an output signal having maximum positive voltage. Those having a phase difference of 180° produce a maximum negative voltage, and those in quadrature produce no output.

The output of the comparator 36 is coupled through a pair of single-pole, double-throw contacts of a sensing relay 49 to a reactance modulator 37. The relay is controlled by a cam operated switch 48 connected in series with a source of power. The motor 23 drives a cam 47 which closes the switch 48 for half of each conical scanning cycle.

The modulator 37 is coupled to a variable frequency reference oscillator 31 having output circuits coupled to the modulators 30 and 34. The oscillator 31 also has an output circuit coupled in cascade in the order named through a restorer mixer 38, a low-pass filter 40 and a rate counter 41 to a speed indicator 42. An input circuit of the restorer mixer 38 is connected to a fixed reference frequency oscillator 39, preferably operating at the frequency of the intermediate frequency signal translated through the amplifiers 32 and 35, that is, at 10 kcs. An output circuit of the rate counter 41 is connected directly to a heading velocity phase comparator 45 and through a 90° phase shifter 43 to a drift velocity phase comparator 44. The velocity reference generator 25 is connected to input circuits of both the comparators 44 and 45. The output circuits of these comparators are connected to a velocity indicator 46. The indicator 46 provides orthogonal indications of velocity in response to drift and heading control signals. The comparators 36, 44 and 45 have similar conventional circuits.

*Operation of the Embodiment in FIG. 3*

Considering now the operation of the embodiment illustrated in FIG. 3, the transmitter 22 generates a radio signal which is coupled to the directive antennas 11 and 12 to radiate overlapping beams to ground. Returned echoes are received by the antennas 11 and 12 and applied to the video mixers 26 and 27, respectively. There the transmitted radio signals and their received echoes are heterodyned to provide Doppler frequency video signals in the outputs of the mixers 26 and 27. The video signals are individually coupled to different one of the amplifiers 28 and 29 and then applied to the frequency tracking loop. The loop comprises a converter means to translate the signals into a pair of predetermined intermediate frequency signals, and phase comparator means responsive to the predetermined signals for producing an output control signal corresponding in frequency with that of the received signals generated along the axis of symmetry. The converter means includes the balanced modulators 30 and 34, the filter amplifiers 32 and 35, the oscillator 31 and the reactance modulator 37. The phase comparator means includes the phase shifter 33 and phase comparator 36. The video signals are low-frequency signals whose frequency is representative of the velocity of the aircraft. As noted above, because of uneven ground terrain, thermal noise and other factors, many Doppler frequencies of varying phase may be developed. However, there should be only one congruent signal picked up by the pair of antennas. This signal will not be of constant frequency if the velocity of the craft is changing. In the modulators 30 and 34 the Doppler signal, for example a 1,000 cycle signal, is converted to a pair of 10 kilocycles intermediate frequency signals differing in phase in accordance with the principles discussed with respect to FIG. 2.

The variable frequency oscillator provides a beat-frequency signal which varies, for example, from some low frequency to 10,000 cycles under the control of the intermediate-frequency control signal from the phase comparator 36 applied to the modulator 37. The phase relation between the 10 kilocycle intermediate frequency signal outputs of the filter amplifiers 32 and 35 preserve the phase relation between the video frequency signals applied to the modulators 30 and 34 when the signal out of the oscillator 31 varies in frequency. These video signals have a 0° phase relation only if derived from signals reflected along the axis of symmetry between the antennas. If these video signals having like frequencies are generated from off the axis of symmetry, their travel paths will be unequal; hence, the signals will be out of phase. If the assumed 1,000 cycle Doppler signals are precisely in phase, the oscillator 31 produces a beat frequency signal of 9 kilocycles to add to the Doppler signals in the modulators 30 and 34 to provide the pair of 10 kilocycle intermediate signals. The filter amplifiers 32 and 35 select and amplify the 10 kilocycle signals. The 10 kilocycle signal out of the filter amplifier 32 is shifted 90° in phase by the shifter 33 and applied to the speed phase comparator 36. The second 10 kilocycle signal out of the filter amplifier 35 is also applied to the comparator 36. The comparator 36 operates as a null-tracking phase comparator circuit. The output of the comparator 36 is appropriately polarized to provide for example, a positive direct voltage signal when the Doppler signal is below the correct frequency and a negative signal when the Doppler signal is above the correct frequency. The modulator 37 has the well-known characteristic of varying its output reactance in accordance with an input direct voltage signal. If the assumed 1,000 cycle Doppler signals are in phase, the comparator 36 produces no voltage in its output. The reactance of the modulator 37 then remains constant and the oscillator continues to operate at the assumed 9 kilocycles. If, however, the 1,000 cycle Doppler signals are not in phase the reactance of the modulator 37 changes in such a manner as to cause the oscillator 31 to shift in frequency. As long as the Doppler signals tracked by the loop are below the correct frequency, the comparator 36 produces a control signal tending to decrease the frequency of the output of the oscillator 31. Similarly, when the tracked Doppler signals are above the correct frequency, the oscillator 31 tends to shift up in frequency.

The variable signal output of the fixed oscillator 31 is applied to a Doppler frequency restoring circuit. The circuit includes the mixer 38, the oscillator 39 and the low-pass filter 40. The variable reference frequency signal produced by the oscillator 31 is heterodyned with the fixed reference frequency signal of the oscillator 39 in the mixer 38 to provide a restored Doppler frequency signal. The filter 40 selects the difference Doppler frequency signal and applies it to the rate counter 41. The counter preferably converts the Doppler frequency signal into a direct voltage proportional to the Doppler frequency to produce an implicit measure of resultant speed in the speed indicator 42.

As the antennas rotate as described above, the Doppler signals along the axis of symmetry and having the same phase vary in frequency, from zero to a maximum proportional to a resultant speed. There are two opposed directions, normal to the actual direction of motion, at which no incremental Doppler frequency is observed; i.e., at which the Doppler frequency is zero. It will be apparent that for one complete rotation of the antennas 11 and 12, the Doppler frequency goes through zero and maximum twice. The Doppler frequency is thus apparently frequency modulated at twice the scanning frequency. Accordingly, the output voltage of the counter 41 varies in amplitude at twice the scanning frequency. This varying voltage is applied through the velocity phase shifter 43 to the drift velocity phase comparator 44. There the velocity reference signal output of the generator 25 is compared in phase with the output of shifter 43 to provide a drift control signal for velocity along a drift axis. Another output of the counter 41 is compared in the heading velocity phase comparator 45 with the velocity phase reference signal output of the generator 25 to provide a heading control signal for velocity along a heading axis orthogonal to the drift axis. Preferably, the heading and drift axes coincide with longitudinal and transverse axes of the helicopter 10. The velocity indicator 46 provides an orthogonal indication of velocity in response to the drift and heading control signals.

As noted above, the phase loop tracks Doppler signals resulting from the motion of the aircraft. When the antennas are oriented within the 180° sector toward the direction of motion, the phase loop provides a control signal of the proper sense to track the desired Doppler signal. When the antennas are oriented within the 180° sector away from the direction of motion, however, the phase loop provides a control signal of the wrong sense, opposite that necessary to correctly track the desired Doppler signal. It is, consequently, the function of the sensing relay 49 for 180° of the scanning cycle to reverse the polarity of the control signal output of the comparator 36 to correctly adjust the frequency of the oscillator 31. The motor 23 drives an eccentric cam 47 which closes the switch 48 to energize the relay 49 for half each scanning cycle. Since the comparator 36 is balanced, it provides an output characterized by either polarity of direct voltage relative to ground. The sensing relay 49 is thus able to select the appropriate polarity control signal for correctly tracking the Doppler signal.

It will be apparent from the above description that the present invention is broadly applicable to the problem of frequency selection in addition to markedly enhancing the more specific area of velocity measurement.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A Doppler system comprising a pair of antennas, a source of high frequency electrical energy, means connecting energy from said source to said antennas to cause said antennas to radiate signals in two beams which intersect, said two intersecting beams being characterized by a null axis such that echo signals of equal frequency reflected along said null axis maintain a constant relative phase difference, a local oscillator, modulator means associated with each of said antennas for heterodyning the output of said local oscillator with a signal derived from the associated antenna, a comparator for comparing the phases of the outputs of said modulator means, and means responsive to the output of said comparator to cause the frequency of said local oscillator to change in a direction causing the phases of the compared signals to attain a predetermined and constant phase relation with respect to one another.

2. A Doppler system comprising a pair of antennas which are fixed relative to each other, a source of high frequency electrical energy connected to the antennas to cause the antennas to radiate beams of wave energy of the same frequency, the antennas being oriented to cause the beams of energy to intersect, the intersecting beams being characterized by a null axis such that echoes from the beams reflected along the null axis are in phase, means associated with each antenna for deriving Doppler signals from the echo signals received by the associated antenna, a local oscillator, a first modulator for heterodyning the output of the local oscillator with the Doppler signals derived from one antenna, a second modulator for heterodyning the output of the local oscillator with the Doppler signals derived from the other antenna, a comparator for comparing the phases of the outputs of the first and second modulators and means responsive to the output of the comparator for causing the frequency of the local oscillator to change in a direction causing the compared signals to have a predetermined and constant phase relation with respect to each other.

3. An electronic velocity indicator apparatus, comprising: a pair of directional antennas for directively transmitting and receiving radio signals, said antennas being characterized by overlapping field patterns; a motor coupled to said antennas for effecting their rotation to provide conical beams, a velocity reference generator driven by said motor to provide a velocity reference signal; a transmitter coupled to said antennas to provide a source of transmitted radio signals; a pair of video mixers coupled to said transmitter and said antennas for heterodyning transmitted radio signals and their received echoes to provide a pair of video signals; a variable frequency oscillator to provide a variable frequency reference signal; a pair of balanced modulators coupled to said oscillator and said mixers for heterodyning said video signals and said variable reference signal to provide a pair of intermediate frequency signals; a pair of intermediate frequency filter amplifiers coupled to said balanced modulators to pass signals of a predetermined intermediate frequency; a speed quadrature phase shifter coupled to one of said filter amplifiers; a speed phase comparator coupled to said phase shifter and the other of said filter amplifiers to provide an intermediate control signal varying in accordance with the phase relation between said predetermined signals; a reactance modulator coupled between said phase comparator and said variable frequency oscillator for varying the frequency of operation of said oscillator in accordance with the frequency of said intermediate control signal; a restorer mixer oscillator coupled to said variable frequency oscillator for heterodyning signals from said variable frequency oscillator and said fixed reference frequency oscillator to provide a Doppler intermediate frequency signal; a low-pass filter coupled to said restorer mixer; a rate counter coupled to said low-pass filter for producing an output voltage proportional to the frequency of the mixer output signal; a speed indicator coupled to said counter to provide an indication of speed proportional to said output voltage; a velocity quadrature phase shifter coupled to said rate counter; a drift velocity phase comparator coupled to said velocity quadrature phase shifter and said velocity reference generator to provide a drift control signal; a heading velocity phase comparator coupled to said counter and said velocity reference generator to provide a heading control signal; and a velocity indicator coupled to said drift phase comparator and said heading phase comparator to provide indications of velocity in response to said drift and heading control signals respectively.

4. Electrical control apparatus, comprising: a signal source having an output of signals varying in frequency; a second signal source having an output of signals also varying in frequency, at least one signal from each of said sources having the same frequency as one of said signals from the other source; converter means coupled to said sources to translate said signals having the same frequency into predetermined intermediate frequency signals; and phase comparator means responsive to said predetermined intermediate frequency signals for producing an output control signal indicative of said same frequency and varying in accordance with the phase relation between said predetermined signals.

5. Electrical control apparatus, comprising: a signal source having an output of signals varying in frequency; a second signal source having an output of signals also varying in frequency, at least one signal from each of said sources having the same frequency as one of said signals from the other source; a beat frequency oscillator to provide a beat frequency signal; a first mixing means coupled to said oscillator and said first source for heterodyning said beat signal and one of said signals to provide a first intermediate frequency signal; a second mixing means coupled to said oscillator and said second source for heterodyning said beat signal and the other one of said signals to provide a second intermediate frequency signal; and phase comparator means coupled to both said mixing means for producing an output control signal indicative of the phase relation between said same frequency signals.

6. Electrical control apparatus, comprising: a signal source having an output of signals varying in frequency; a second signal source having an output of signals also varying in frequency, at least one signal from each of said sources having the same frequency; a beat frequency oscillator to provide a beat frequency signal; a first mixing means coupled to said oscillator and said first source for heterodyning said beat signal and one of said signals to provide a first intermediate frequency signal; a second mixing means coupled to said oscillator and said second source for heterodyning said beat signal and the other one of said signals to provide a second intermediate frequency signal; a first intermediate frequency filter means coupled to said first mixing means to select a predetermined intermediate frequency signal; a second intermediate frequency filter means coupled to said second mixing means to select a second predetermined intermediate frequency signal; and phase comparator means coupled to said filter means for producing an output signal varying in accordance with the phase relation between said predetermined frequency signals.

7. Electrical control apparatus, comprising: a signal source having an output of signals varying in frequency; a second signal source having an output of signals also varying in frequency, at least one signal from each of said sources having the same frequency as one of said signals from the other source; a beat frequency oscillator to provide a beat frequency signal; a first balanced modulator means coupled to said oscillator and said first source for heterodyning said beat signal and one of said signals to provide a first intermediate frequency signal; a second balanced modulator means coupled to said oscillator and said second source for heterodyning said beat signal and the other one of said signals to provide a second intermediate frequency signal; and phase comparator means coupled to said balanced modulator means for producing an output signal varying in accordance with the phase relation between said same frequency signals.

8. Electrical control apparatus, comprising: a variable frequency signal source; a second variable frequency signal source, at least one signal from each of said sources having the same frequency as a signal from the other source; a variable frequency oscillator to provide a beat frequency signal; a first mixing means coupled to said oscillator and said first source for heterodyning said beat signal and one of said signals to provide a first intermediate frequency signal; a second mixing means coupled to said oscillator and said second source for heterodyning said beat signal and the other one of said signals to provide a second intermediate frequency signal; phase comparator means coupled to both said mixing means for producing an output signal indicative of the phase relation between said same frequency signals; and reactance modulator means coupled to said comparator means and said oscillator to control the frequency of operation of said oscillator in accordance with said output signal.

9. Electrical control apparatus, comprising: a variable frequency signal source; a second variable frequency source, at least one signal from each of said sources having the same frequency as a signal from the other source; a beat frequency oscillator to provide a beat frequency signal; a first mixing means coupled to said oscillator and said first source for heterodyning said beat signal and one of said signals to provide a first intermediate frequency signal; a second mixing means coupled to said oscillator and said second source for heterodyning said beat signal and the other one of said signals to provide a second intermediate frequency signal; phase comparator means coupled to said mixing means for producing an intermediate control signal, said intermediate control signal varying in accordance with the phase relation between said same frequency signals; means responsive to said intermediate control signal to cause the beat frequency of said beat frequency oscillator to change in a direction causing the phases of said same frequency signals to read a predetermined and constant phase relation with respect to one another; a fixed frequency reference oscillator to provide a constant reference frequency; and restorer mixing means coupled to said beat frequency and fixed frequency reference oscillators to provide an output signal at said same frequency.

10. Electrical control apparatus, comprising: a variable frequency signal source; a second variable frequency signal source, at least one signal from each of said sources having the same frequency as a signal from the other source; a variable frequency oscillator to provide a beat signal; a first balanced modulator means coupled to said oscillator and said first source for heterodyning said beat signal and one of said signals to provide a first intermediate frequency signal; a second balanced modulator means coupled to said oscillator and said second source for heterodyning said beat signal and the other one of said signals to provide a second intermediate frequency signal; a first filter means coupled to said first balanced modulator means to select a first predetermined intermediate frequency signal; a second intermediate frequency filter means coupled to said second balanced modulator means to select a second predetermined intermediate frequency signal; and phase comparator means coupling said filter means and said oscillator, said phase comparator means controlling said oscillator frequency to and varying its output in accordance with the phase relation between said same frequency signals.

11. Electrical control apparatus, comprising: a variable frequency signal source; a second variable frequency signal source, at least one signal from each of said sources having the same frequency as a signal from the other source; a variable frequency oscillator to provide a beat signal; a first balanced modulator means coupled to said oscillator and said first source for heterodyning said beat signal and one of said signals to provide a first intermediate frequency signal; a first filter means coupled to said first balanced modulator means to select a first predetermined intermediate frequency signal; a second balanced modulator means coupled to said oscillator and said second source for heterodyning said beat signal and the other one of said signals to provide a second intermediate frequency signal; a second intermediate frequency filter means coupled to said second balanced modulator means to select a second predetermined intermediate frequency signal; a quadrature phase shifting means coupled to said first filter means; and phase comparator means coupling said phase shifting means, said second balanced modulator means and said oscillator for controlling said oscillator frequency to be representative of said same frequency and vary in accordance with the phase relation between said same frequency signals.

12. Electrical control apparatus, comprising: a variable frequency signal source; a second variable frequency signal source, at least one signal from each of said sources having the same frequency as a signal from another source; a variable frequency oscillator to provide a beat signal; a first mixing means coupled to said oscillator and said first source for heterodyning said beat signal and one of said signals to provide a first intermediate frequency signal; a first filter means coupled to said first mixing means to select a first predetermined intermediate frequency signal; a second mixing means coupled to said oscillator and said second source for heterodyning said beat signal and the other one of said signals to provide a second intermediate frequency signal; a second intermediate frequency filter means coupled to said second mixing means to select a second predetermined intermediate frequency signal; a quadrature phase shifting means coupled to said first filter means; phase comparator means coupled to said mixing means for producing an output control signal varying in accordance with the phase relation between said same frequency signals; means responsive to said control signal to cause the beat signal of said variable frequency oscillator to change frequency in a direction causing the phases of said same frequency signals to attain a predetermined and constant phase relation with respect to one another; a fixed reference frequency oscillator to provide a constant reference frequency; and restorer mixing means coupled to the output of both said oscillators to provide an output signal.

References Cited in the file of this patent
UNITED STATES PATENTS

| | | |
|---|---|---|
| 2,085,424 | Goddard | June 29, 1937 |
| 2,467,361 | Blewett | Apr. 12, 1949 |